(12) United States Patent
Savakis et al.

(10) Patent No.: US 6,832,006 B2
(45) Date of Patent: Dec. 14, 2004

(54) SYSTEM AND METHOD FOR CONTROLLING IMAGE COMPRESSION BASED ON IMAGE EMPHASIS

(75) Inventors: Andreas E. Savakis, Rochester, NY (US); Majid Rabbani, Pittsford, NY (US); Stephen P. Etz, Venice, FL (US)

(73) Assignee: Eastman Kodak Company, Rochester, NY (US)

( * ) Notice: Subject to any disclaimer, the term of this patent is extended or adjusted under 35 U.S.C. 154(b) by 554 days.

(21) Appl. No.: 09/911,299

(22) Filed: Jul. 23, 2001

(65) Prior Publication Data

US 2003/0059121 A1 Mar. 27, 2003

(51) Int. Cl.[7] .............................................. G06K 9/36
(52) U.S. Cl. ....................................................... 382/239
(58) Field of Search ................................ 382/224, 232, 382/236, 239, 240, 244, 248, 249, 253; 358/1.12, 1.13, 1.15, 426.01, 426.02; 348/384.1; 375/240

(56) References Cited

U.S. PATENT DOCUMENTS

| | | | | |
|---|---|---|---|---|
| 4,724,483 A | * | 2/1988 | Shinada | 375/240.12 |
| 5,418,895 A | | 5/1995 | Lee | 395/131 |
| 5,424,945 A | | 6/1995 | Bell | 364/419.2 |
| 5,825,917 A | * | 10/1998 | Suzuki | 382/164 |
| 5,838,833 A | * | 11/1998 | Ishikawa et al. | 382/249 |
| 5,875,265 A | | 2/1999 | Kasao | 382/229 |
| 5,903,676 A | * | 5/1999 | Wu et al. | 382/244 |
| 5,991,515 A | * | 11/1999 | Fall et al. | 358/1.15 |
| 6,014,133 A | * | 1/2000 | Yamakado et al. | 345/501 |
| 6,121,969 A | * | 9/2000 | Jain et al. | 345/850 |
| 6,185,253 B1 | * | 2/2001 | Pauls | 375/240.02 |
| 6,674,908 B1 | * | 1/2004 | Aronov | 382/232 |
| 6,731,807 B1 | * | 5/2004 | Pazmino et al. | 382/232 |

OTHER PUBLICATIONS

U.S. patent application Ser. No. 09/112,661, Lee et al., filed Jul. 9, 1998.
U.S. patent application Ser. No. 09/223,860, Luo et al., filed Dec. 31, 1998.
U.S. patent application Ser. No. 09/274,645, Savakis et al., filed Mar. 23, 1999.
JPEG Group (IJG) software for JPEG compression available at the following site: ftp://ftp.uu.net/graphics/jpeg.

* cited by examiner

Primary Examiner—Jose L. Couso
(74) Attorney, Agent, or Firm—David M. Woods

(57) ABSTRACT

A method to automatically vary the compression of images by ranking images within clusters based upon image emphasis. The ranking process computes one or more quantities related to one or more features in each image. The features can include the content of images. The invention processes the quantities with a reasoning algorithm that is trained based on opinions of one or more human observers. The invention applies the quantities to the images to produce the ranking and variably compresses the images depending upon the ranking. The images having a low ranking and are compressed more than images that have a high ranking.

28 Claims, 13 Drawing Sheets

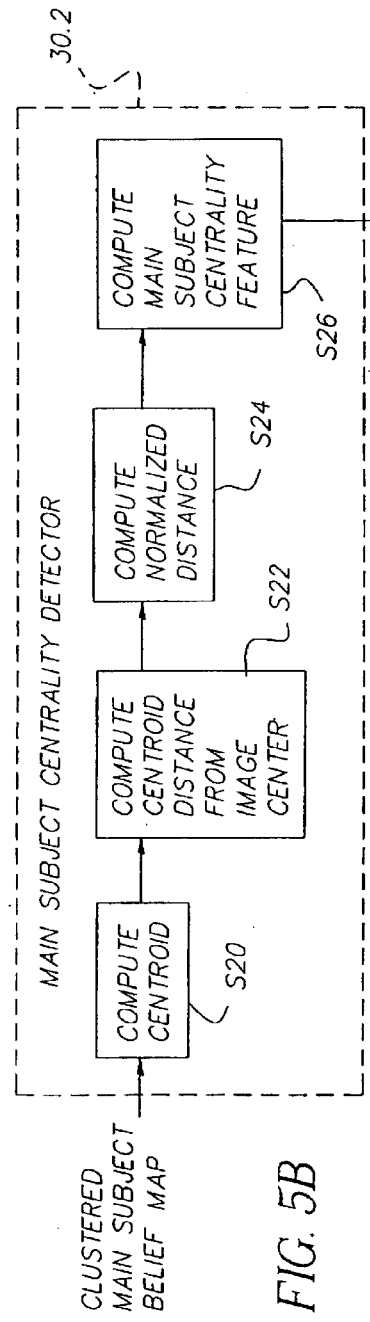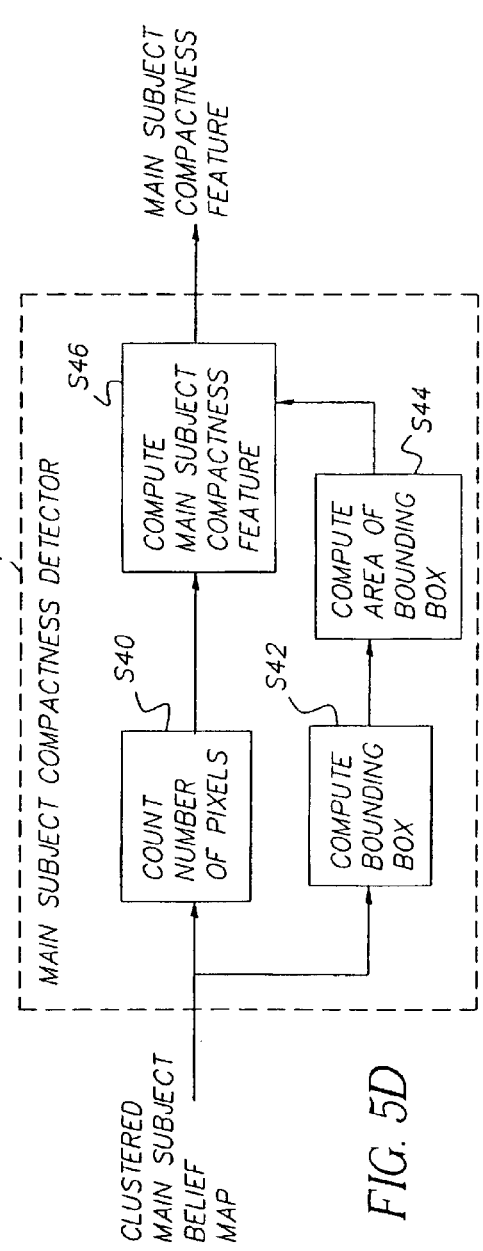
FIG. 5B
FIG. 5D

SYSTEM AND METHOD FOR CONTROLLING IMAGE COMPRESSION BASED ON IMAGE EMPHASIS

FIELD OF THE INVENTION

The invention relates generally to the field of image processing, and in particular to the field of image assessment and understanding.

BACKGROUND OF THE INVENTION

Image assessment and understanding deal with problems that are easily solved by human beings given their intellectual faculties but are extremely difficult to solve by fully automated computer systems. Image understanding problems that are considered important in photographic applications include main subject detection, scene classification, sky and grass detection, people detection, automatic detection of orientation, etc. In a variety of applications that deal with a group of pictures, it is important to rank the images in terms of a logical order, so that they can be processed or treated according to their order. A photographic application of interest is automatic albuming, where a group of digital images are automatically organized into digital photo albums. This involves clustering the images into separate events and then laying out each event in some logical order, if possible. This order implies at least some attention to the relative content of the images, i.e., based on the belief that some images would likely be preferred over others.

Typically, digital imaging systems that store groups of images in a fixed storage space apply the same level of compression to all images in the group. This may be the situation for images stored in digital cameras, portable disks, etc. However, this approach does not take into consideration differences in emphasis or appeal between images. It is often desirable to maintain the visual quality of images that are appealing, while it is tolerable to degrade the visual quality of images that are not appealing. Therefore, it is desirable to obtain a digital system that ranks images in terms of their relative appeal and uses the results of this ranking to vary the amount of compression applied to each image, so that the higher quality is maintained for higher appeal images.

Due to the nature of the image assessment problem, i.e., that an automated system is expected to generate results that are representative of high-level cognitive human (understanding) processes, the design of an assessment system is a challenging task. Effort has been devoted to evaluating text and graphical data for its psychological effect, with the aim of creating or editing a document for a particular visual impression (see, e.g., U.S. Pat. Nos. 5,875, 265 and 5,424,945). In the '265 patent, a system analyzes an image, in some case with the aid of an operator, to determine correspondence of visual features to sensitive language that is displayed for use by the operator. The difficulty in this system is that the visual features are primarily based on low level features, i.e., color and texture, that are not necessarily related to image content, and a language description is difficult is to use for relative ranking of images. The '945 patent discloses a system for evaluating the psychological effect of text and graphics in a document. The drawback with the '945 patent is that it evaluates the overall visual impression of the document, without regard to its specific content, which reduces its usefulness for developing relative ranking. Besides their complexity and orientation toward discernment of a psychological effect, these systems focus on the analysis and creation of a perceptual impression rather than on the assessment and utilization of an existing image.

SUMMARY OF THE INVENTION

The present invention is directed to overcoming one or more of the problems set forth above. In one embodiment, the amount of compression for an image in the group is controlled using a quality factor whose value is related to image emphasis/appeal of the image that is compressed. In another embodiment, compression is controlled based on visual quality, and in another embodiment compression is controlled based on output file size. In all cases, the image parameters that determine the level compression are a function of image emphasis/appeal.

The determination of image emphasis or appeal, i.e., the degree of importance, interest or attractiveness of an image is based on an assessment of the image with respect to certain features, wherein one or more quantities are computed that are related to one or more features in each digital image, including one or more features pertaining to the content of the individual digital image. The quantities are processed with a reasoning algorithm that is trained on the opinions of one or more human observers, and an output is obtained from the reasoning algorithm that assesses each image. In a dependent aspect of the invention, the features pertaining to the content of the digital image include at least one of people-related features and subject-related features. Moreover, additional quantities may be computed that relate to one or more objective measures of the digital image, such as colorfulness or sharpness. The results of the reasoning algorithm are processed to rank order the quality of each image in the set of images. The amount of compression applied to each digital image are varied based on the degree of importance, interest or attractiveness of the image, determined as by itself or as related to the group of digital images.

The invention automatically varies the compression of images by ranking the images within clusters based upon image emphasis. The ranking process includes computes one or more "quantities" related to one or more features in each image and the content of the images. The invention processes the quantities with a reasoning algorithm that is trained based on opinions of one or more human observers and applies the quantities to the images to produce the ranking. The invention variably compresses the images depending upon the ranking such that images having a low ranking are compressed more than images having a high ranking. The features analyzed can include people-related features and subject-related features. The objective features can include colorfulness, sharpness, representative quality in terms of color content, and uniqueness of picture aspect format. The reasoning algorithm is trained from ground truth studies of candidate images and is a Bayesian network. The content of the images is controlled using a quality factor whose value is related to image emphasis/appeal and is also controlled based on output file size whose value is related to image emphasis/appeal. The content of images is further controlled using the visual quality of an output image.

One advantage of the invention lies in its ability to perform an assessment of one or more images without human intervention. In a variety of applications that deal with a group of pictures, such as compression of groups of images, such an algorithmic assessment enables the automatic ranking of images, so that they can be more efficiently compressed according to their relative importance.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 5A–5D are detailed diagrams of the component methods shown in FIG. 3 for main subject detection.

DETAILED DESCRIPTION OF THE INVENTION

Figure 1:
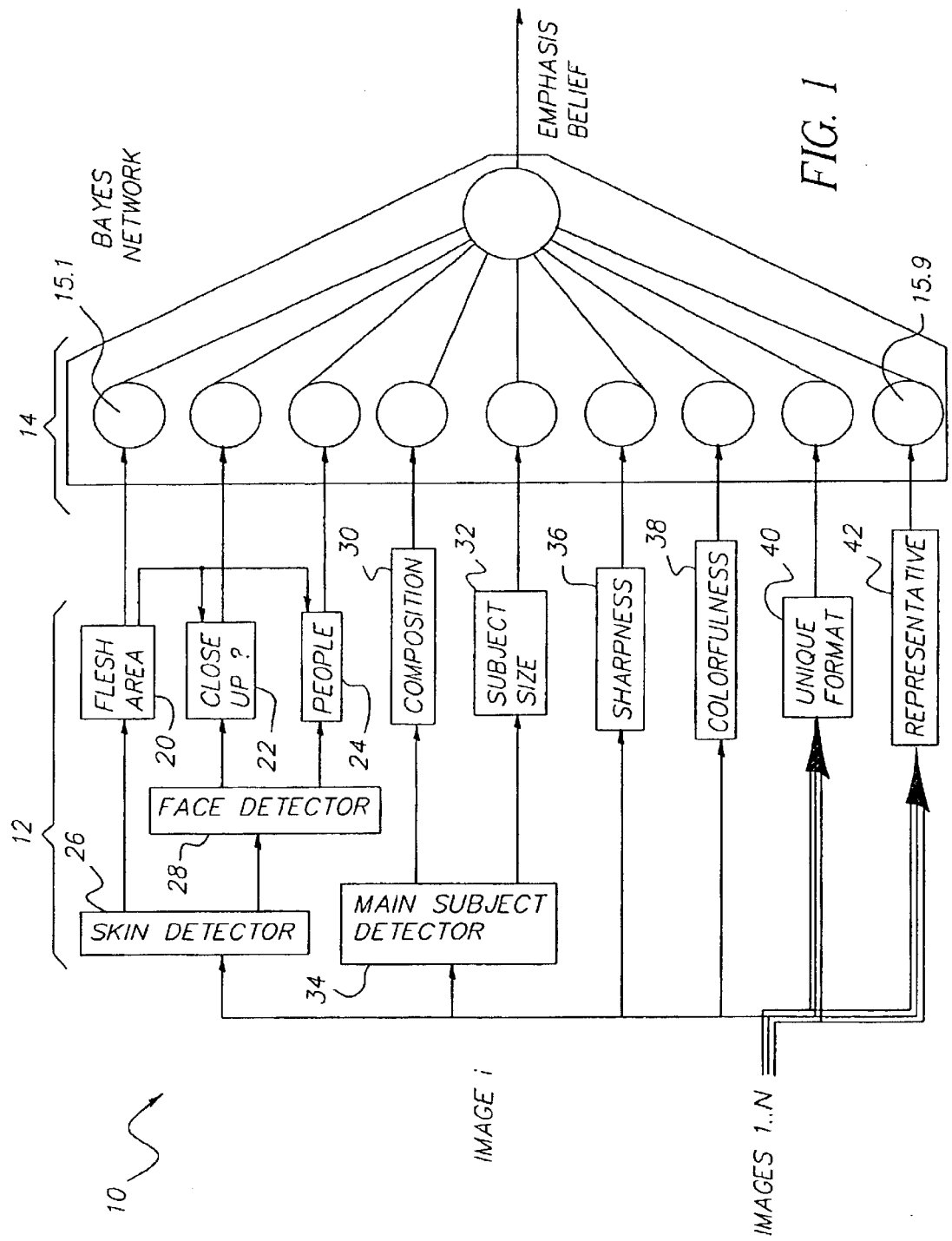
FIG. 1 is a block diagram of a network for calculating an emphasis value for an image.

In the following description, a preferred embodiment of the present invention will be described as a method that could be implemented as a software program. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements thereof known in the art. Given the description as set forth in the following specification, all software implementation thereof as a computer program is conventional and within the ordinary skill in such arts.

Still further, as used herein, the computer program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

In a variety of applications that deal with a group of pictures, it is important to rank the images in terms of their relative value and/or their intrinsic value, so that they can be processed or treated according to these values. As mentioned before, a photographic application currently of interest is automatic albuming, where a group of digital images is automatically organized into digital photo albums. This involves clustering the images into separate events and then laying out each event in some logical order. This logical order may be based upon two related assessments of the images: image appeal and image emphasis. Image appeal is the intrinsic degree of importance, interest or attractiveness of an individual picture; image emphasis, on the other hand, is the relative importance, interest or attractiveness of the picture with respect to other pictures in the event or group.

Once the assessments are obtained, it would be desirable to select the most important image in the group of images, e.g., the one that should receive the most attention in a page layout. Therefore, an image assessment algorithm would fit well into the automatic image compression architecture. The assessment algorithm would be expected to operate on the images of each event and assign assessment values (i.e., emphasis and/or appeal values) to each image. The assessment values may be viewed as metadata that are associated with every image in a particular group and may be exploited by other algorithms. In such a proposed system, the page layout algorithm would take as input the relative assessment values of all images in each event.

However, in any proposed system there are many open questions about the type of system architecture and the selection of effective features for evaluation. An architecture that has been successfully applied to other image understanding problems is based on a feature extraction stage followed by a classification stage. With respect to feature extraction, it is necessary to select an ensemble of features. For this, there are two likely approaches. One is to select features that intuitively appear to have some relevance to image assessment values. The problem with this approach is that there is no good justification for the selection of features. A second approach is to base feature selection on experience gained through controlled experiments. Since the inventors found no such experiments on record, a ground truth study was conducted to obtain data that would point to meaningful features. The results of the ground truth study are used for feature selection and for training the classifier.

Figure 4:
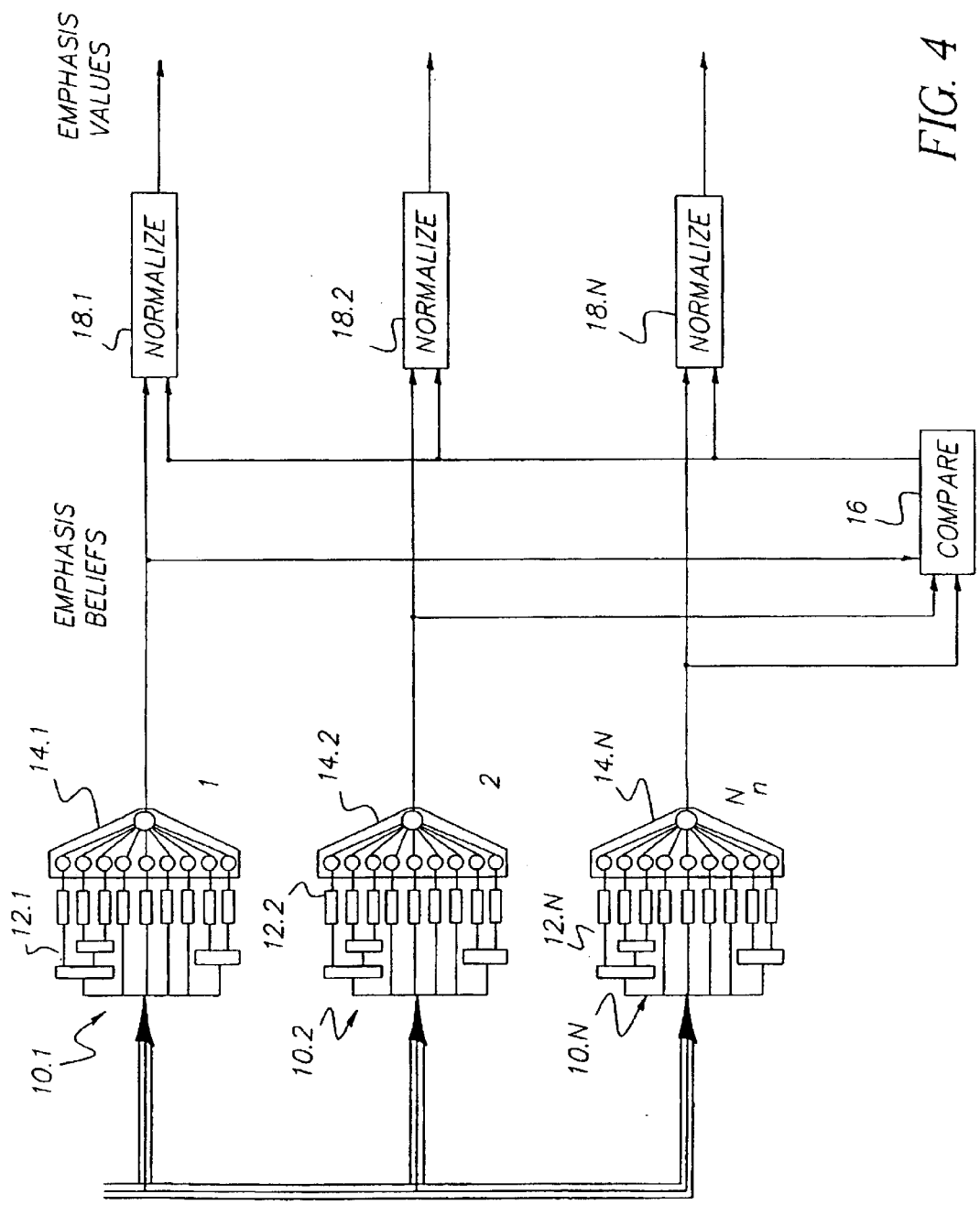
FIG. 4 is a block diagram of a network architecture for calculating the relative emphasis values of a group of images.

Referring first to FIG. 1, an image emphasis network 10 for computing an emphasis value is shown to comprise two stages: A feature extraction stage 12 and a classification stage 14. The feature extraction stage 12 employs a number of algorithms; each designed to measure some image feature characteristic, where a quantitative measure of the feature is expressed by the value of the output of the algorithm. The outputs of the feature extraction stage 12 thus represent statistical evidence of the presence (or absence) of certain features; the outputs are then integrated by the classification stage 14 to compute an emphasis value. This value may, e.g., range from 0 to 100 and indicates the likelihood or belief that the processed image is the emphasis image. After the emphasis values have been computed for a group of images in separate image emphasis networks 10.1, 10.2 ... 10.N, as shown in FIG. 4, the emphasis values are compared in a comparator stage 16 and normalized in respective normalization stages 16.1, 16.2 ... 16.N. The image with the highest emphasis value is chosen as the emphasis image for the group.

Figure 3:
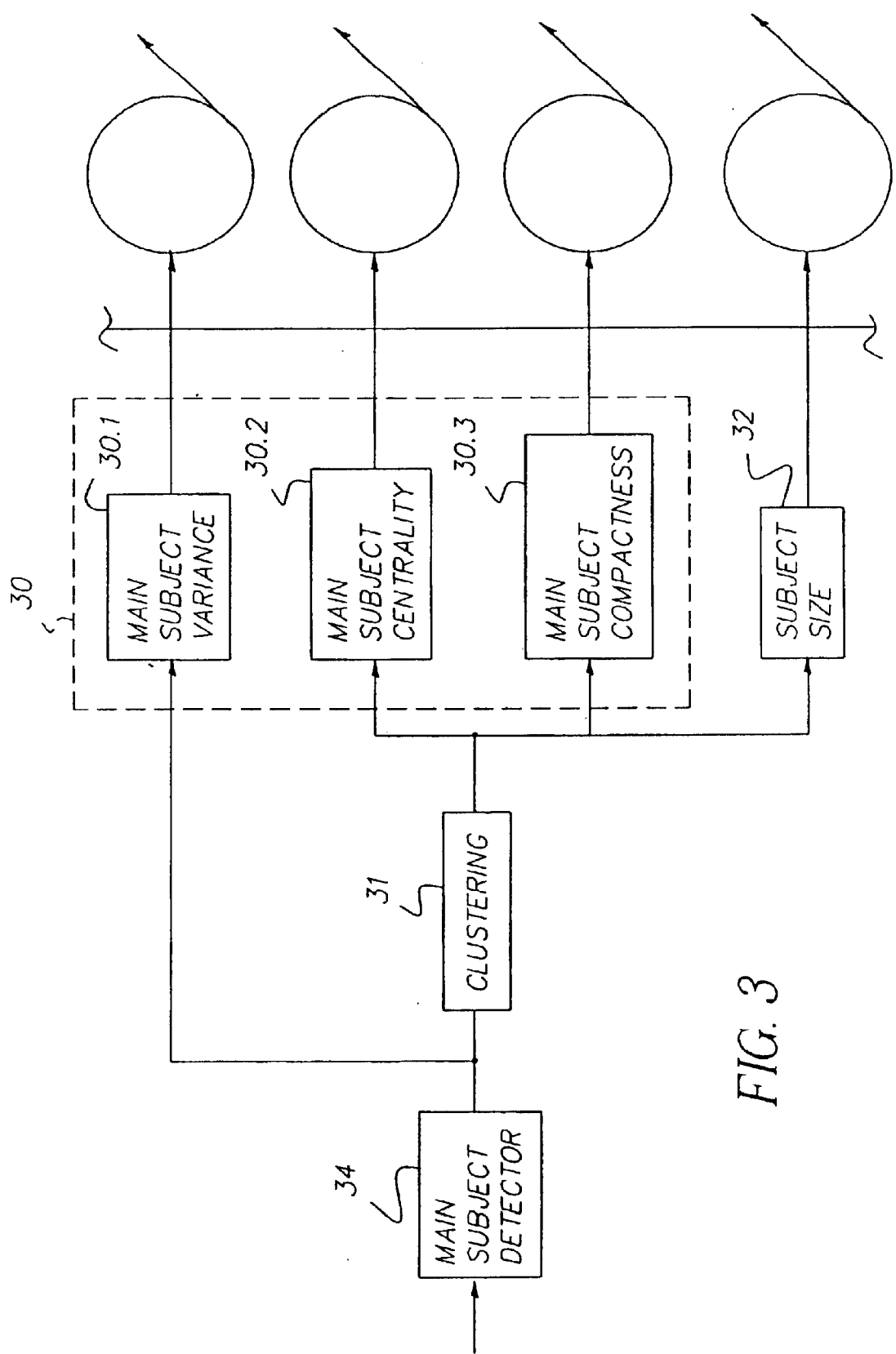
FIG. 3 is a block diagram showing in more detail the components of main subject detection as shown in FIGS. 1 and 2.

An ensemble of features was selected for the feature extraction stage 12 on the basis of ground truth studies of the preference of human observers. The ground truth studies showed that the features that are important for emphasis image selection are not strongly related to traditional image quality metrics, such as sharpness, contrast, film grain and exposure, although one or more of these traditional metrics may continue to have value in the calculation of an assessment value. The selected features may be generally divided into three categories: (a) features related to people, (b) features related to the main subject, and (c) features related to objective measures of the image. Referring to FIG. 1, features related to people are extracted by a skin area detector 20, a close-up detector 22 and a people detector 24. The input image i is typically processed through a skin detector 26 and a face detector 28 to generate intermediate values suitable for processing by the people-related feature detectors 20, 22 and 24. The features related to the main subject are extracted by a composition detector 30 and a subject size detector 32, based on input from a main subject detector 34. The composition detector 30 is composed of several composition-related main subject algorithms, as shown in FIG. 3, including a main subject variance algorithm 30.1, a main subject centrality algorithm 30.2 and a main subject compactness algorithm 30.3. The main subject data is clustered in a clustering stage 31 and then provided to the composition-related algorithms 30.2 and 30.3 and to the subject size algorithm 32. The features related to objective measures of the image are extracted by a sharpness detector 36, a colorfulness detector 38 and a unique format detector 40. In addition, an objective measure related to how representative the color content of an image is relative to a group of images is extracted by a representative color detector 42.

Figure 2:
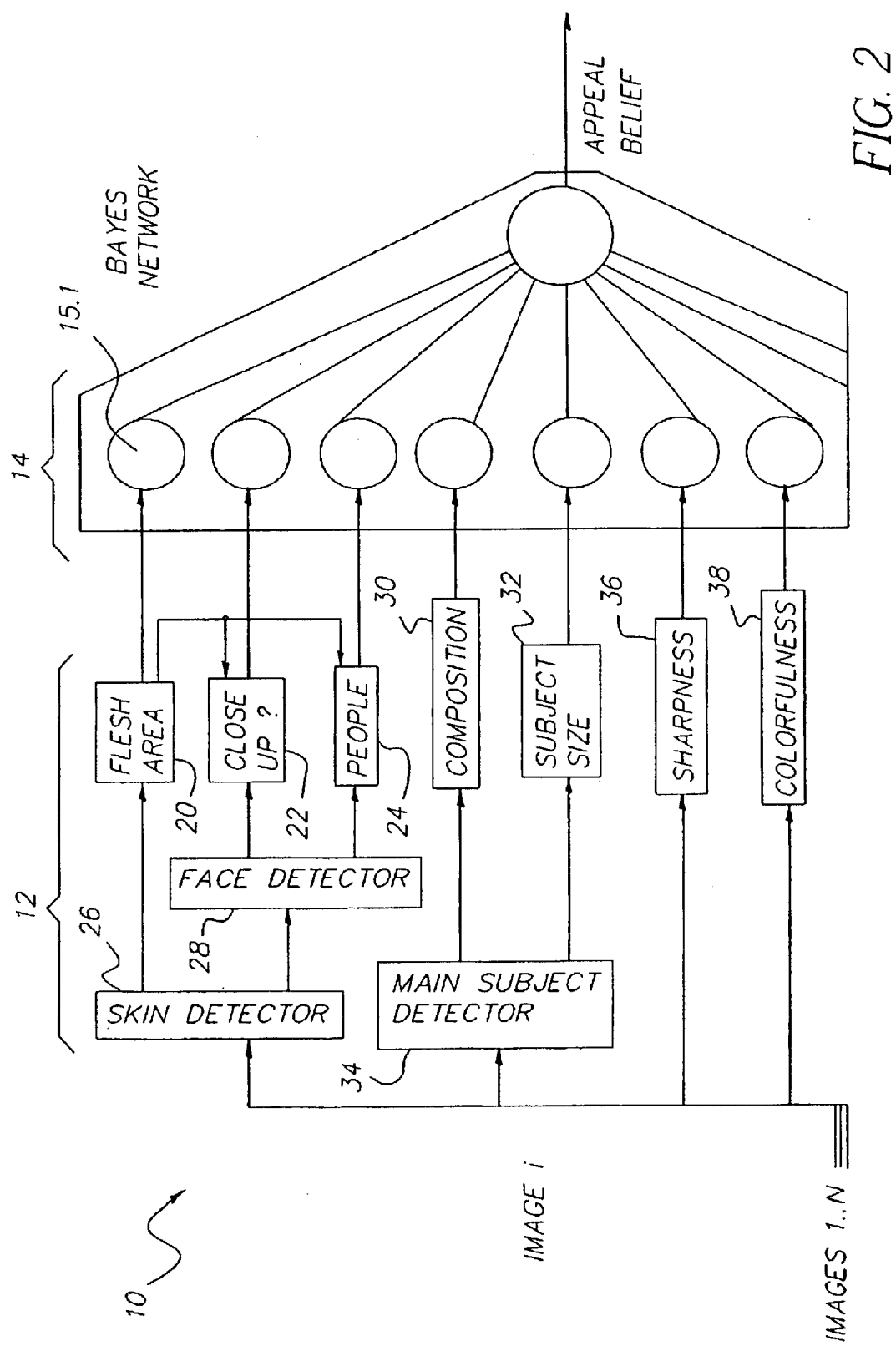
FIG. 2 is a block diagram of a network for calculating an appeal value for an image.

The feature ensemble shown in FIG. 1 is used to calculate a value representative of image emphasis, which is defined as the degree of relative importance, interest or attractiveness of an image with respect to other images in a group. Since each image must be evaluated in relation to other images in a group, the image emphasis calculation thus embodies a network of image emphasis networks 10.1, 10.2 . . . 10.N, such as shown in FIG. 4, which scores the images as to their respective emphasis values. In practice, there may be but one image emphasis network 10, which is repeatedly engaged to determine the image emphasis value of a series of images; in this case, the sequentially obtained results could be stored in an intermediate storage (not shown) for input to the comparator 16. The feature ensemble shown in FIG. 2, which is a subset of the feature ensemble shown in FIG. 1, is used to calculate a value representative of image appeal, which is defined as the intrinsic degree of importance, interest or attractiveness of an image in an absolute sense, that is, without reference to other images. The features shown in FIG. 2 are thus referred to as self-salient features, inasmuch as these features can stand on their own as an assessment of an image. In comparison, two additional features are detected in FIG. 1, namely, the unique format feature and the representative color feature; these are referred to as relative-salient features, inasmuch as these features are measurements that necessarily relate to other images. (These features, however, are optional insofar as a satisfactory measure of emphasis can be obtained from the self-salient features alone.) Consequently, an assessment of both appeal and emphasis involve self-salient features, while only an assessment of emphasis may involve relative-salient features.

The extraction of the feature ensembles according to FIGS. 1 and 2 involves the computation of corresponding feature quantities, as set forth below.

Objective Features

Objective features are the easiest to compute and provide the most consistent results in comparison to other types of features. Methods for computing them have been available for some time, and a large art of imaging science is based on such measures. Although a large number of objective features could potentially be computed, only colorfulness and sharpness are considered for purposes of both image emphasis and appeal (FIGS. 1 and 2), and additionally unique format and representative color for purposes of image emphasis (FIG. 1). Other objective measures, such as contrast and noise, may be found useful in certain situations and are intended to be included within the coverage of this invention.

Colorfulness

Figure 6:
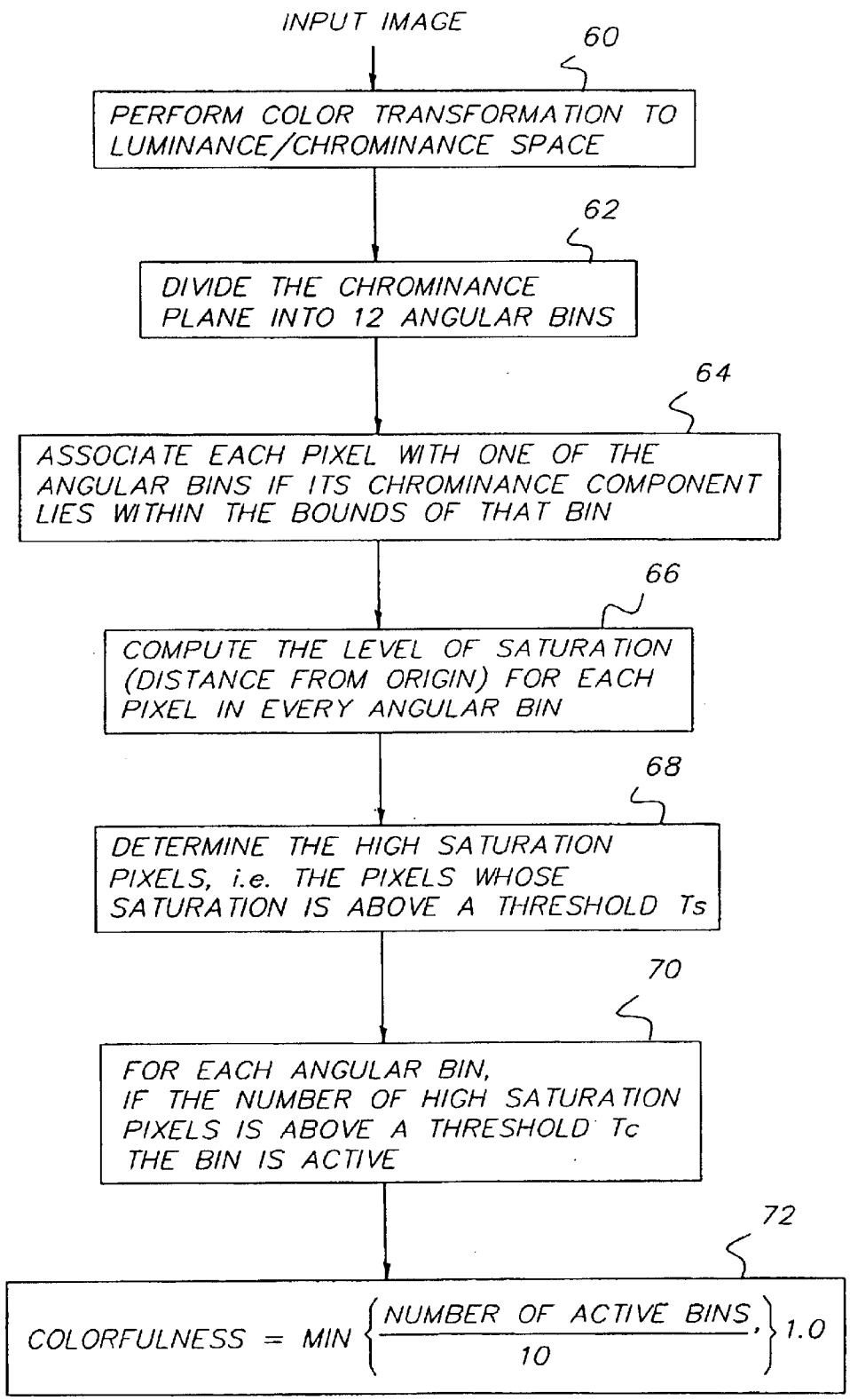
FIG. 6 is a detailed diagram of a method for determining the colorfulness of an image.
Figure 7:
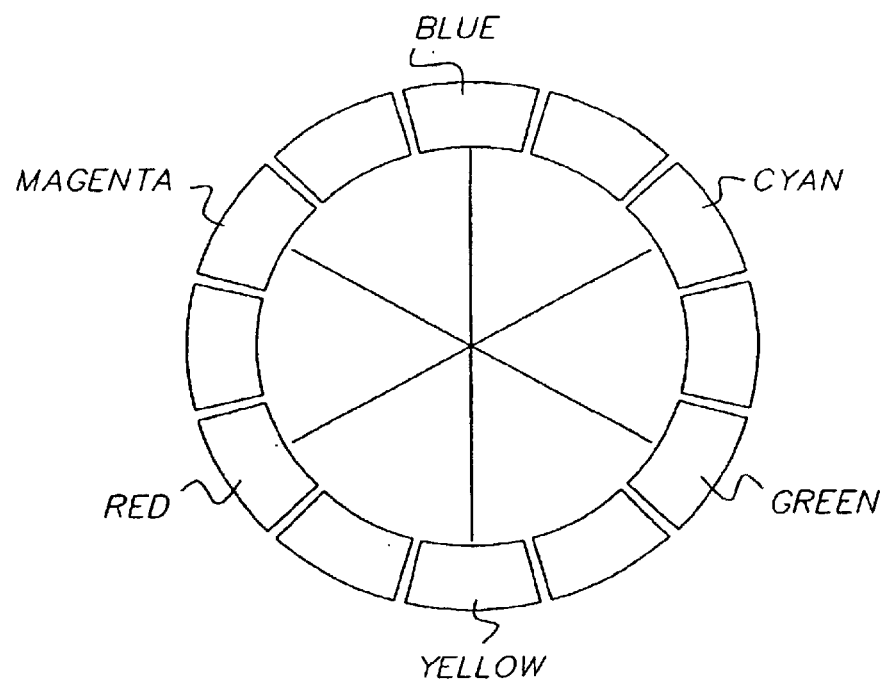
FIG. 7 is a diagram of chromaticity plane wedges that are used for the colorfulness feature computation.

The colorfulness detector 38 provides a quantitative measure of colorfulness based on the observation that colorful pictures have colors that display high saturation at various hues. This was determined in ground truth studies by examining for the presence of high saturation colors along various hues. The assumption of sRGB color space was made with respect to the image data. In particular, and as shown in FIG. 6, the colorfulness detector 38 implements the following steps for computing colorfulness. Initially, in step 60, the input image values i are transformed to a luminance/chrominance space. While many such transformations are known to the skilled person and may be used with success in connection with the invention, the preferred transformation is performed according to the following expressions:

$$\text{Neutral} = \left(\frac{R+G+B}{3}\right)$$

$$\text{Green-Magenta} = \left(\frac{2G-R-B}{4}\right)$$

$$\text{Illumination} = \left(\frac{B-R}{2}\right)$$

where neutral is a measure of luminance, and green-magenta and illumination are a measure of chrominance. In step 62, the chrominance plane (illumination, green-magenta) is divided and quantized into twelve chromaticity plane wedges, as shown in FIG. 7, which are referred to as angular bins. Next, in step 64, each pixel is associated with one of the angular bins if its chrominance component lies within the bounds of that bin. The level of saturation (which is the distance from origin) is calculated in step 66 for each pixel in each angular bin. The number of high saturation pixels that populate each angular bin are then measured in step 68, where a high saturation pixel is one whose distance from the origin in the chrominance plane is above a certain threshold $T_s$ (e.g., $T_s=0.33$). For each angular bin, the bin is determined to be active in step 70 if the number of high saturation pixels exceeds a certain threshold $T_c$ (e.g., $T_c=250$ pixels). Colorfulness is then calculated in step 72 according to the following expression:

$$\text{Colorfulness} = \min\left\{\frac{\text{Number of active bins}}{10}, 1.0\right\}$$

Note that this definition of colorfulness assumes that if 10 out of the 12 bins are populated, colorfulness is considered to be 1.0 and the image is most colorful.

Sharpness

The sharpness detector 36 implements the following steps to find sharpness features in the image:

a) The image is cropped at a 20% level along the border and converted to grayscale by extracting the green channel;

b) The image edges are detected in the green channel using a Sobel operator after running a 3×3 averaging filter to reduce noise;
c) An edge histogram is formed and the regions that contain the strongest edges are identified as those that are above the 90$^{th}$ percentile of the edge histogram;
d) The strongest-edge regions are refined through median filtering, and the statistics of the strongest edges are computed; and
e) The average of the strongest edges provides an estimate of sharpness.

Further details of the method employed for sharpness detection may be found in commonly assigned U.S. Ser. No. 09/274,645, entitled "A Method for Automatically Detecting Digital Images that are Undesirable for Placing in Albums", filed Mar. 23, 1999 in the names of Andreas Savakis and Alexander Loui, and which is incorporated herein by reference.

Format Uniqueness

Participants in the ground truth experiment indicated that pictures taken in APS "panoramic" mode are more deserving of emphasis. Preliminary analysis of the ground truth data indicated that if a picture was the only panoramic picture in a group, this fact increases its likelihood of being selected as the emphasis image. The relative feature "format uniqueness" represents this property.

The unique format detector 40 implements the following algorithm for each image i in the group, in which the format f is based on the long and short pixel dimensions is $l_i$, $s_i$, of the image:

$$f_i \equiv \begin{cases} C, & l_i/s_i < 1.625, \\ H, & 1.625 \le l_i/s_i < 2.25, \\ P, & 2.25 \le l_i/s_i. \end{cases}$$

Then format uniqueness U is $$Ui = \begin{cases} 1, & f_i \ne f_j, \forall i \ne j, \\ 0, & \text{otherwise.} \end{cases}$$

Representative Color

The representative color detector 42 implements the following steps to determine how representative the color of an image is:

1. For each image i, compute the color histogram $h_i$ (R,G,B) (in RGB or Luminance/Chrominance space)
2. Find the average color histogram for the group by averaging all of the image histograms as follows:

$$A_h(R, G, B) = \sum_{i=1}^{N} h_i(R, G, B)$$

3. For each image i, compute the distance between the histogram of the image and the average color histogram (Euclidian or Histogram intersection distance), as follows:

$$d_i(R, G, B) = \frac{1}{2} \sum_{i=1}^{N} |h_i(R, G, B) - A_h(R, G, B)|$$

4. Find the maximum of the distances computed in 3, as follows:

$$d_{\max}(R, G, B) = \max_{i=1, N} \{d_i(R, G, B)\}$$

5. The representative measure r is obtained by dividing each of the distances with the maximum distance (can vary from 0 to 1), as follows:

$$r_i(R, G, B) = \frac{d_i(R, G, B)}{d_{\max}(R, G, B)}$$

People-Related Features

People related features are important in determining image emphasis, but many of the positive attributes that are related to people are difficult to compute, e.g. people smiling, people facing camera, etc. Skin detection methods allow the computation of some people-related features such as: whether people are present, the magnitude of the skin area, and the amount of closeup.

Skin and Face Detection

The skin detection method that is used by the skin detector 26, and the face detection method that is used by the face detector 28, is based on the method disclosed in commonly assigned patent application Ser. No. 09/112,661 entitled "A Method for Detecting Human Faces in Digitized Images" which was filed Jul. 9, 1998 in the names of H. C. Lee and H. Nicponski, and which is incorporated herein by reference.

Figure 8:
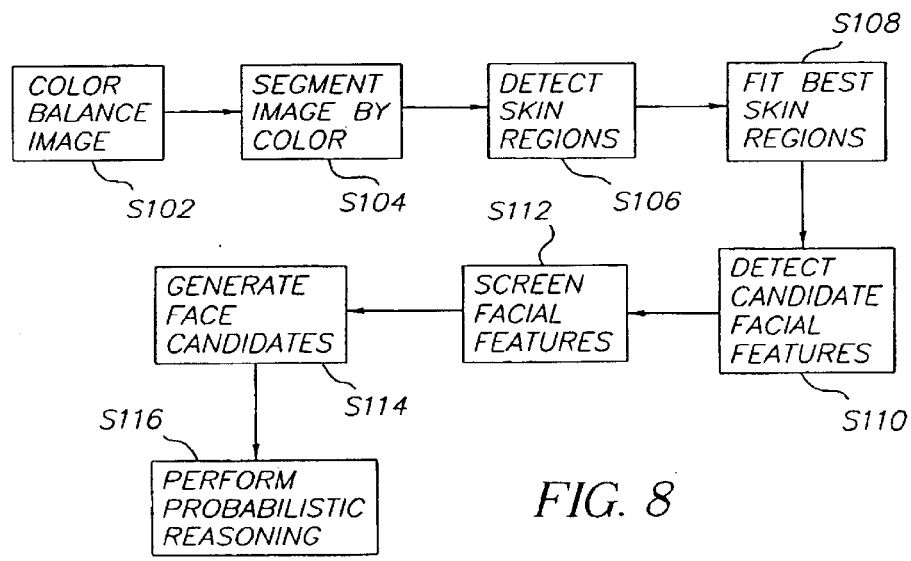
FIG. 8 is a block diagram of a method for skin and face detection.

Referring to FIG. 8, an overview is shown of the method disclosed in Ser. No. 09/112,661. The input images are color balanced to compensate for predominant global illumination in step S102, which involves conversion from (r,g,b) values to (L,s,t) values. In the (L,s,t) space, the L axis represents the brightness of a color, while the s and t axes are chromatic axes. The s component approximately represents the illuminant variations from daylight to tungsten light, from blue to red. The t component represents an axis between green and magenta. A number of well-known color balancing algorithms may be used for this step, including a simple method of averaging-to-gray. Next, a k-mode clustering algorithm is used for color segmentation in step S104. A disclosure of this algorithm is contained in commonly assigned U.S. Pat. No. 5,418,895, which is incorporated herein by reference. Basically, a 3-D color histogram in (L,s,t) space is formed from the input color image and processed by the clustering algorithm. The result of this step is a region map with each connected region having a unique label. For each region, the averaged luminance and chromaticity are computed in step S106. These features are used to predict possible skin regions (candidate skin regions) based on conditional probability and adaptive thresholding. Estimates of the scale and in-plane rotational pose of each skin region are then made by fitting a best ellipse to each skin region in step S108. Using a range of scales and in-plane rotational pose around these estimates, a series of linear filtering steps are applied to each facial region in step S110 for identifying tentative facial features. A number of probability metrics are used in step S112 to predict the likelihood that the region actually represents a facial feature and the type of feature it represents.

Features that pass the previous screening step are used as initial features in a step S114 for a proposed face. Using projective geometry, the identification of the three initial features defines the possible range of poses of the head. Each possible potential face pose, in conjunction with a generic three-dimensional head model and ranges of variation of the position of the facial features, can be used to predict the location of the remaining facial features. The list of candidate facial features can then be searched to see if the predicted features were located. The proximity of a candidate feature to its predicted location and orientation affects the probabilistic estimate of the validity of that feature.

A Bayesian network probabilistic model of the head is used in a step S116 to interpret the accumulated evidence of the presence of a face. The prior probabilities of the network are extracted from a large set of training images with heads in various orientations and scales. The network is initiated with the proposed features of the candidate face, with their estimated probabilities based on computed metrics and spatial conformity to the template. The network is then executed with these initial conditions until it converges to a global estimate of the probability of face presence. This probability can be compared against a hard threshold or left in probabilistic form when a binary assessment is not needed. Further details of this skin and face detection method may be found in Ser. No. 09/112,661, which is incorporated herein by reference.

Skin Area

The percentage of skin/face area in a picture is computed by the skin area detector 20 on its own merit, and also as a preliminary step to people detection and close-up detection. Consequently, the output of the skin area detector 20 is connected to the classification stage 14 and also input to the close-up detector 22 and the people detector 24. Skin area is a continuous variable between 0 and 1 and correlates to a number of features related to people. For example, for pictures taken from the same distance, increasing skin area indicates that there are more people in the picture and correlates with the positive indicator of "whole group in photo." Alternatively, if two pictures contain the same number of people, larger skin area may indicate larger magnification, which correlates with the positive attribute of "closeup." Other explanations for larger skin area are also possible due to subject positioning.

Close-up

The close-up detector 22 employs the following measure for determining close-up:
  a) skin detection is performed and the resulting map is examined at the central region (25% from border); and
  b) close-up is determined as the percentage of skin area at the central portion of the image.

In some cases, face detection would be more appropriate than skin detection for determining close-up.

People Present

The presence of people is detected by the people detector 24 when a significant amount of skin area is present in the image. The percentage of skin pixels in the image is computed and people are assumed present when the skin percentage is above a threshold $T_f$ number of pixels (e.g., $T_f$=20 pixels). People present is a binary feature indicating the presence or absence of people for 1 or 0 respectively.

Composition Features

Good composition is a very important positive attribute of picture emphasis and bad composition is the most commonly mentioned negative attribute. Automatic evaluation of the composition of an image is very difficult and sometimes subjective. Good composition may follow a number of general well-known rules, such as the rule of thirds, but these rules are often violated to express the photographer's perspective.

Main Subject Detection

Figure 9:
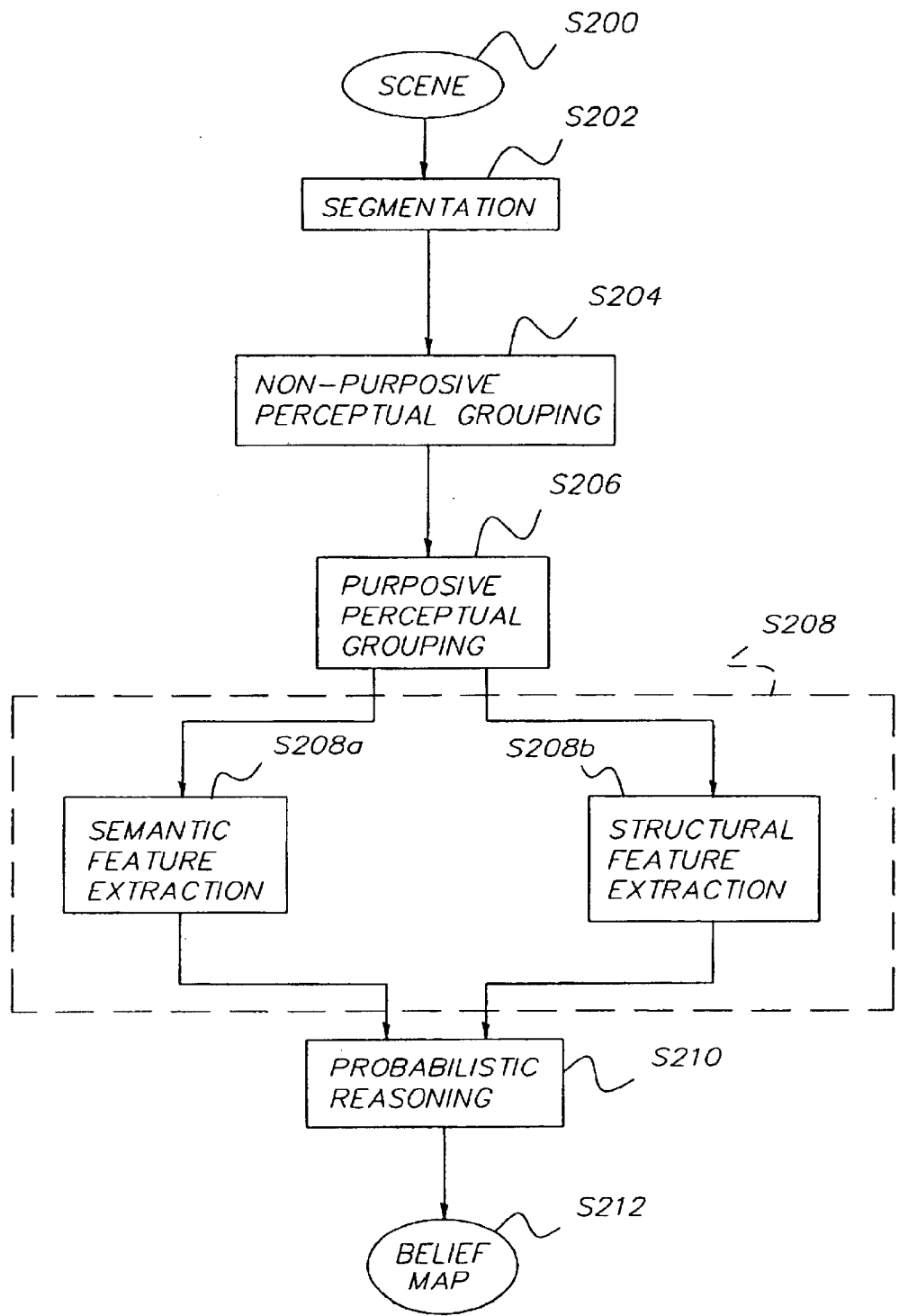
FIG. 9 is a detailed block diagram of main subject detection as shown in FIG. 5.

The algorithm used by the main subject detector 34 is disclosed in commonly assigned patent application Ser. No. 09/223,860 entitled "Method for Automatic Determination of Main Subjects in Consumer Images", filed Dec. 31, 1998 in the names of J. Luo, S. Etz and A. Singhal that is incorporated herein by reference. Referring to FIG. 9, there is shown a block diagram of an overview of the main subject detection method disclosed in Ser. No. 09/223,860. First, an input image of a natural scene is acquired and stored in step S200 in a digital form. Then, the image is segmented in step S202 into a few regions of homogeneous properties. Next, the region segments are grouped into larger regions in step S204 based on similarity measures through non-purposive perceptual grouping, and further grouped in step S206 into larger regions corresponding to perceptually coherent objects through purposive grouping (purposive grouping concerns specific objects). The regions are evaluated in step S208 for their saliency using two independent yet complementary types of saliency features—structural saliency features and semantic saliency features. The structural saliency features, including a set of low-level early vision features and a set of geometric features, are extracted in step S208a, which are further processed to generate a set of self-saliency features and a set of relative saliency features. Semantic saliency features in the forms of key subject matters, which are likely to be part of either foreground (for example, people) or background (for example, sky, grass), are detected in step S208b to provide semantic cues as well as scene context cues. The evidences of both types are integrated in step S210 using a reasoning engine based on a Bayes net to yield the final belief map step S212 of the main subject.

To the end of semantic interpretation of images, a single criterion is clearly insufficient. The human brain, furnished with its a priori knowledge and enormous memory of real world subjects and scenarios, combines different subjective criteria in order to give an assessment of the interesting or primary subject(s) in a scene. The following extensive list of features are believed to have influences on the human brain in performing such a somewhat intangible task as main subject detection: location, size, brightness, colorfulness, texturefulness, key subject matter, shape, symmetry, spatial relationship (surroundedness/occlusion), borderness, indoor/outdoor, orientation, depth (when applicable), and motion (when applicable for video sequence).

The low-level early vision features include color, brightness, and texture. The geometric features include location (centrality), spatial relationship (borderness, adjacency, surroundedness, and occlusion), size, shape, and symmetry. The semantic features include skin, face, sky, grass, and other green vegetation. Those skilled in the art can define more features without departing from the scope of the present invention. More details of the main subject detection algorithm are provided in Ser. No. 09/223,860, which is incorporated herein by reference.

The aforementioned version of the main subject detection algorithm is computationally intensive and alternative versions may be used that base subject detection on a smaller set of subject-related features. Since all of the composition measures considered here are with respect to the main subject belief map, it is feasible to concentrate the system on the most computationally effective aspects of these measures, such as aspects bearing mostly on the "centrality" measure. These aspects are considered in judging the main subject, thereby reducing the overall computational complexity at the expense of some accuracy. It is a useful property of the Bayesian Network used in the main subject detection algorithm that features can be excluded in this way without requiring the algorithm to be retrained. Secondly, it takes advantage of the fact that images supplied to main subject detector 50 are known to be oriented right side up. The subject-related features associated with spatial location of a region within the scene can be modified to reflect this knowledge. For example, without knowing scene orientation the main subject detector 50 assumes a center-weighted distribution of main subject regions, but with known orientation a bottom-center-weighted distribution may be assumed.

Referring to FIG. 3, after the main subject belief map has been computed in the main subject detector 50, it is segmented in a clustering stage 31 into three regions using k-means clustering of the intensity values. The three regions correspond to pixels that have high probability of being part of the main subject, pixels that have low probability of being part of the main subject, and intermediate pixels. Based on the quantized map, the features of main subject size, centrality, compactness, and interest (variance) are computed as described below in reference to FIGS. 5A–5D.

Main Subject Variance

One way to characterize the contents of a photograph is by how interesting it is. For the purpose of emphasis image selection, an image with the following characteristics might be considered interesting.

the main subject is interesting in and of itself, by virtue of its placement in the frame.

the main subject constitutes a reasonably large area of the picture, but not the entire frame.

the background does not include isolated objects that can distract from the main subject.

Figure 5A:
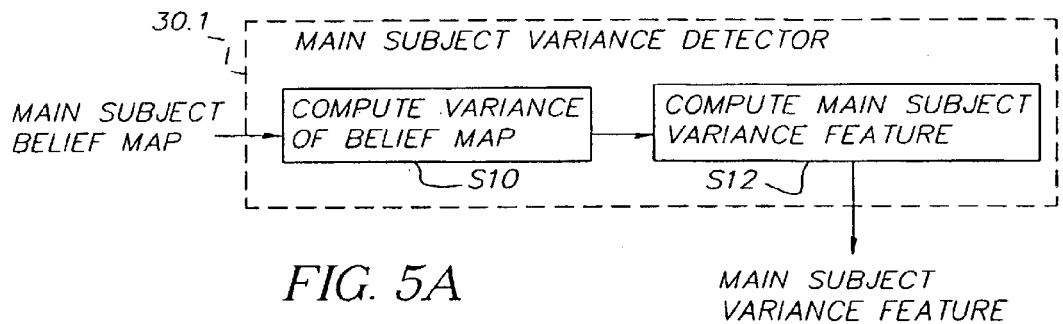

An estimate of the interest level of each image is computed by estimating the variance in the main subject map. This feature is primarily valuable as a counterindicator: that is, uninteresting images should not be the emphasis image. In particular, and as shown in FIG. 5A, the main subject variance detector 30.1 implements the following steps for computing main subject variance. Initially, in step S10, the statistical variance v of all main subject belief map values is computed. In step S12, the main subject variance feature y is computed according to the formula:

$$y=\min(1,2.5*\mathrm{sqrt}(v)/127.5)$$

Main Subject Centrality

The main subject centrality is computed as the distance between the image center and the centroid of the high probability (and optionally the intermediate probability) region(s) in the quantized main subject belief map. In particular, and as shown in FIG. 5B, the main subject centrality detector 30.2 implements the following steps for computing main subject centrality. Initially, in step S20, the pixel coordinates of the centroid of the highest-valued cluster is located. In step S22, the Euclidean distance j from the center of the image to the centroid is computed. In step S24, the normalized distance k is computed by dividing j by the number of pixels along the shortest side of the image. In step S26, the main subject centrality feature m is computed according to the formula:

$$m=\min(k,1)$$

Main Subject Size

Figure 5C:
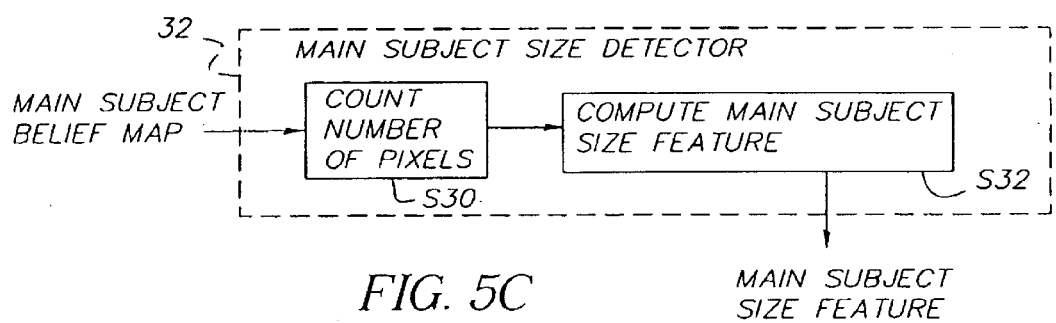

The size of the main subject is determined by the size of the high probability (and optionally the intermediate probability) region(s) in the quantized main subject belief map. It is expressed as the percentage of the central area (25% from border) that is occupied by the high (and optionally the intermediate) probability region. In particular, and as shown in FIG. 5C, the main subject size detector 32 implements the following steps for computing main subject size. Initially, in step S30, the number of pixels f in the intersection of the highest-valued cluster and the rectangular central ¼ of the image area is counted. In step S32, the main subject size feature g is computed according to the formula:

$$g=f/N$$

where N is the total number of image pixels.

Main Subject Compactness

The compactness of the main subject is estimated by computing a bounding rectangle for the high probability (and optionally the intermediate probability) region(s) in the quantized main subject belief map, and then examining the percentage of the bounding rectangle that is occupied by the main subject. In particular, and as shown in FIG. 5D, the main subject compactness detector 30.3 implements the following steps for computing main subject compactness. Initially, in step S40, the number of pixels a in the highest-valued cluster is counted. In step S42, the smallest rectangular box which contains all pixels in the highest-valued cluster (the bounding box) is computed, and in step S44 the area b of the bounding box, in pixels, is calculated. In step S46, the main subject compactness feature e is determined according to the formula:

$$e=\min(1, \max(0,2*(a/b-0.2)))$$

where e will be a value between 0 and 1, inclusive.

Classification Stage

The feature quantities generated according to the algorithms set forth above are applied to the classification stage 14, which is preferably a reasoning engine that accepts as input the self-salient and/or the relative-salient features and is trained to generate image assessment (emphasis and appeal) values. Different evidences may compete or reinforce each according to knowledge derived from the results of the ground truth study of human observers—evaluations of real images. Competition and reinforcement are resolved by the inference network of the reasoning engine. A preferred reasoning engine is a Bayes network.

A Bayes net (see, e.g., J. Pearl, *Probabilistic Reasoning in Intelligent Systems*, San Francisco, Calif.: Morgan Kaufmann, 1988) is a directed acyclic graph that represents causality relationships between various entities in the graph, where the direction of links represents causality relationships between various entities in the graph, and where the direction of links represents causality. Evaluation is based on knowledge of the Joint Probability Distribution Function (PDF) among various entities. The Bayes net advantages include explicit uncertainty characterization, efficient computation, easy construction and maintenance, quick training, and fast adaptation to changes in the network structure and its parameters. A Bayes net consists of four components:

Priors: The initial beliefs about various nodes in the Bayes net.

Conditional Probability Matrices (CPMs): Expert knowledge about the relationship between two connected nodes in the Bayes net.

Evidences: Observations from feature detectors that are input to the Bayes net.

Posteriors: The final computed beliefs after the evidences have been propagated through the Bayes net.

The most important component for training is the set of CPMs, shown as CPM stages 15.1 . . . 15.9 in FIG. 1 (and 15.1 . . . 15.7 in FIG. 2) because they represent domain knowledge for the particular application at hand. While the derivation of CPMs is familiar to a person skilled in using reasoning engines such as a Bayes net, the derivation of an exemplary CPM will be considered later in this description.

Referring to FIGS. 1 and 2, a simple two-level Bayes net is used in the current system, where the emphasis (or appeal) score is determined at the root node and all the feature detectors are at the leaf nodes. It should be noted that each link is assumed to be conditionally independent of other links at the same level, which results in convenient training of the entire net by training each link separately, i.e., deriving the CPM for a given link independent of others. This assumption is often violated in practice; however, the independence simplification makes implementation feasible and produces reasonable results. It also provides a baseline for comparison with other classifiers or reasoning engines.
Probabilistic Reasoning All the features are integrated by a Bayes net to yield the emphasis or appeal value. On one hand, different evidences may compete with or contradict each other. On the other hand, different evidences may mutually reinforce each other according to prior models or knowledge of typical photographic scenes. Both competition and reinforcement are resolved by the Bayes net-based inference engine.

Figure 10:
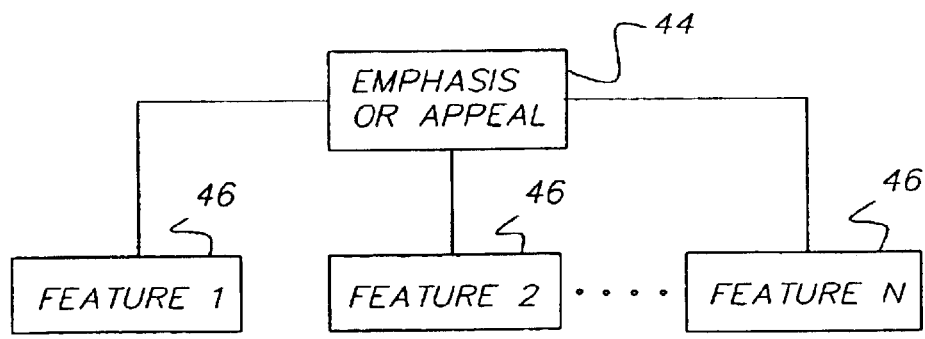
FIG. 10 is a diagram of a two level Bayesian net used in the networks shown in FIGS. 1 and 2.

Referring to FIG. 10, a two-level Bayesian net is used in the present invention that assumes conditional independence between various feature detectors. The emphasis or appeal value is determined at the root node 44 and all the feature detectors are at the leaf nodes 46. There is one Bayes net active for each image. It is to be understood that the present invention can be used with a Bayes net that has more than two levels without departing from the scope of the present invention.
Training Bayes Nets One advantage of Bayes nets is each link is assumed to be independent of links at the same level. Therefore, it is convenient for training the entire net by training each link separately, i.e., deriving the CPM 15.1 . . . 15.9 for a given link independent of others. In general, two methods are used for obtaining CPM for each root-feature node pair:

1. Using Expert Knowledge

This is an ad-hoc method. An expert is consulted to obtain the conditional probabilities of each feature detector producing a high or low output given a highly appealing image.

2. Using Contingency Tables

This is a sampling and correlation method. Multiple observations of each feature detector are recorded along with information about the emphasis or appeal. These observations are then compiled together to create contingency tables which, when normalized, can then be used as the CPM 15.1 . . . 15.9. This method is similar to neural network type of training (learning). This method is preferred in the present invention.

Consider the CPM for an arbitrary feature as an example. This matrix was generated using contingency tables derived from the ground truth and the feature detector. Since the feature detector in general does not supply a binary decision (referring to Table 1), fractional frequency count is used in deriving the CPM. The entries in the CPM are determined by $$CPM = \left[ \left( \sum_{i \in I} \sum_{r \in R_i} n_i F_r^T T_r \right) P \right]^T \quad (14)$$

$$F_r = [f_0^r f_1^r \ldots f_M^r], \quad T_r = [t_0^r t_1^r \ldots t_L^r],$$

$$P = \text{diag}\{p_j\}, \quad p_j = \left( \sum_{i \in I} \sum_{r \in R_i} n_i t_r \right),$$

where I is the set of all training image groups, $R_i$ is the set of all images in group i, $n_i$ is the number of observations (observers) for group i. Moreover, $F_r$ represents an M-label feature vector for image r, $T_r$ represents an L-level ground-truth vector, and P denotes an L×L diagonal matrix of normalization constant factors. For example, in Table 1, images 1, 4, 5 and 7 contribute to boxes 00, 11, 10 and 01 in Table 2, respectively. Note that all the belief values have been normalized by the proper belief sensors. As an intuitive interpretation of the first column of the CPM for centrality, an image with a high feature value is about twice as likely to be highly appealing than not.

TABLE 1

An example of training the CPM.

| Image Number | Ground Truth | Feature Detector Output | Contribution |
|---|---|---|---|
| 1 | 0 | 0.017 | 00 |
| 2 | 0 | 0.211 | 00 |
| 3 | 0 | 0.011 | 00 |
| 4 | 0.933 | 0.953 | 11 |
| 5 | 0 | 0.673 | 10 |
| 6 | 1 | 0.891 | 11 |
| 7 | 0.93 | 0.072 | 01 |
| 8 | 1 | 0.091 | 01 |

TABLE 2

The trained CPM.

| | Feature = 1 | feature = 0 |
|---|---|---|
| Emphasis or Appeal = 1 | 0.35 (11) | 0.65 (01) |
| Emphasis or Appeal = 0 | 0.17 (10) | 0.83 (00) |

While the invention has been described for use with a Bayes net, different reasoning engines may be employed in place of the Bayes net. For example, in *Pattern Recognition and Neural Networks* by B. D. Ripley (Cambridge University Press, 1996), a variety of different classifiers are described that can be used to solve pattern recognition problems, where having the right feature is normally the most important consideration. Such classifiers include linear discriminant analysis methods, flexible discriminants, (feed-forward) neural networks, non-parametric methods, tree-structured classifiers, and belief networks (such as Bayesian networks). It will be obvious to anyone of ordinary skill in such methods that any of these classifiers can be adopted as the reasoning engine for practice of the present invention.
Computer System In describing the present invention, it should be apparent that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 11:
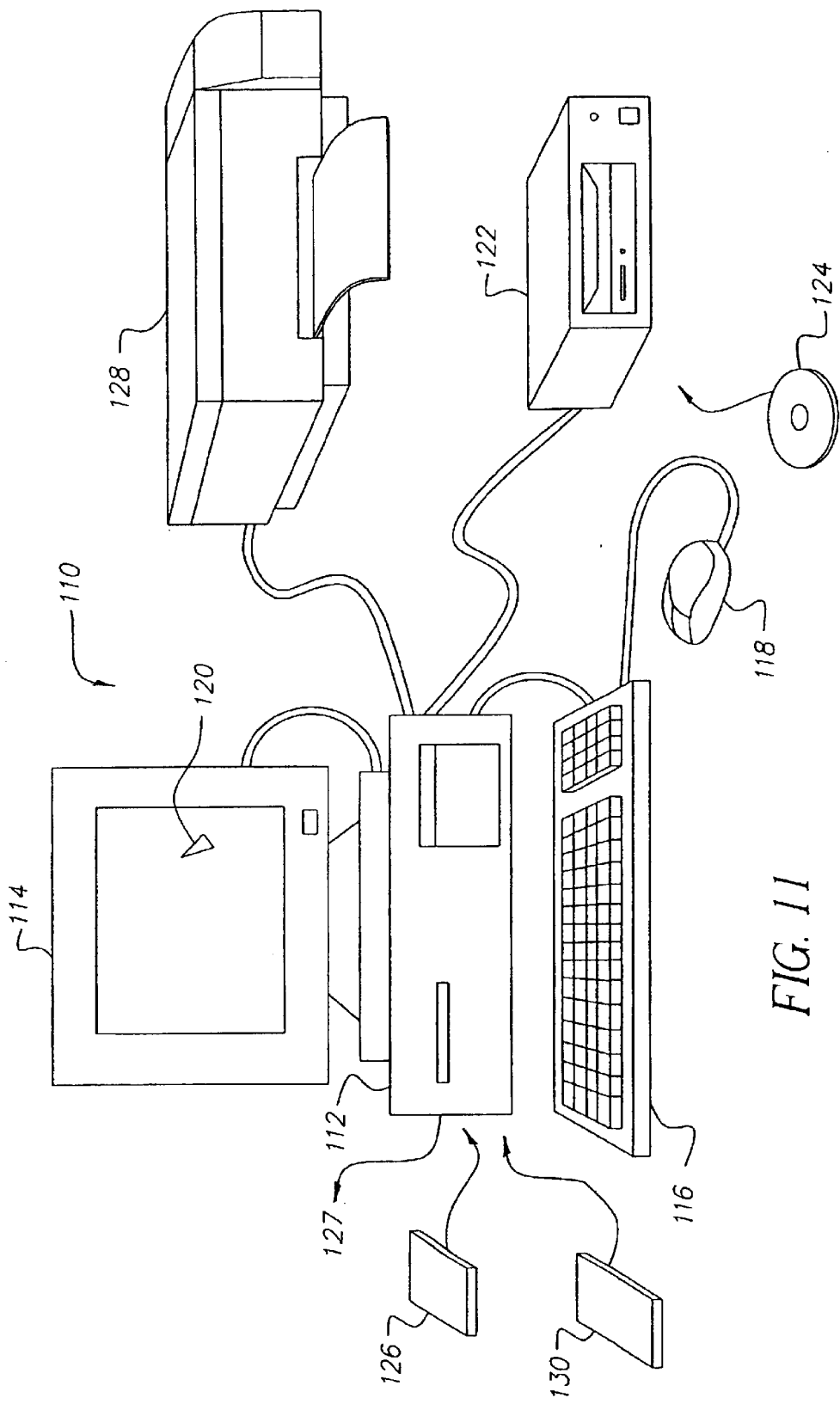
FIG. 11 is a perspective diagram of a computer system for practicing the invention set forth in the preceding figures.

Referring to FIG. 11, there is illustrated a computer system 110 for implementing the present invention.

Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 22 is connected to the microprocessor based unit 112 for receiving software programs and for providing a means of inputting the software programs and other information to the microprocessor based unit 112 via a compact disk 124, which typically includes a software program. In accordance with the invention, this software program could include the image assessment program described herein, as well as programs that utilize its output, such as the automatic image compression program. In addition, a floppy disk 126 may also include the software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. The program could thus stored on a remote server and accessed therefrom, or downloaded as needed. A printer 128 is connected to the microprocessor-based unit 12 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor-based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown).

Figure 12:
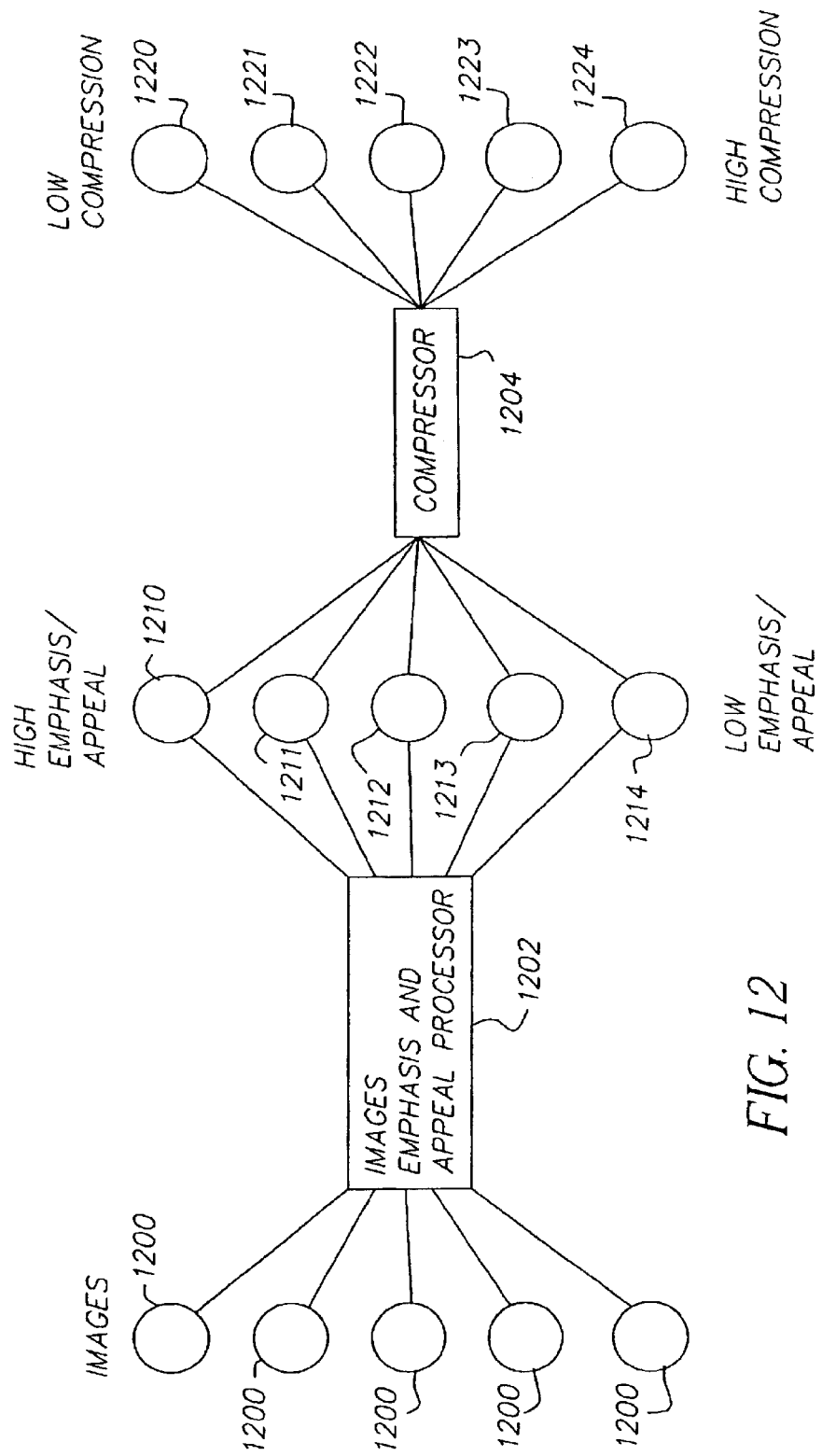
FIG. 12 is a schematic diagram of the image compression system of the invention.

FIG. 12 illustrates one aspect of the invention which utilizes image emphasis and appeal to control the amount of image compression. More specifically, items 1200 represent uncompressed images that are input into the inventive image emphasis and appeal processor 1202. The processor 1202 determines each image's emphasis and appeal, using the processing described above. The images are then ranked 1210–1214 from high emphasis/appeal 1210 to low emphasis/appeal 1214. The images are then compressed with the compressor 1204. More specifically, the images are compressed using any conventional compression technique that allows the compression ratio or the reconstructed image quality to be controlled, such as the JPEG still image compression standard (as described in *Digital compression and coding of continuous-tone still images—Part I: Requirements and Guidelines* (JPEG), ISO/IEC International Standard 10918-1, IIU-T Recommendation T.81, 1993, or W. B. Pennbaker and J. L. Mitchell, *JPEG Still Image Data Compression Standard*, Van Nostrand Reinhold, New York, 1993), or JPEG2000 (as described in ISO/IEC International Standard 15444-1 or ITU-T Recommendation T.800:JPEG2000 *Image Coding System*).

However, instead of compressing all images equally, the compressor 1204 selectively compresses the images having higher emphasis/appeal less than images having lower emphasis/appeal. The rationale for compressing low emphasis images under a higher compression rate is based upon the presumption that the user will find less interest in and less need for details associated with low emphasis/appeal images. To the contrary, the user is more likely to find a need to study the details of high emphasis/appeal images. Therefore, the invention retains more detail of the high emphasis/appeal images.

Thus, as shown on the right side of FIG. 12, high emphasis/appeal images 1210 will have a relatively low compression 1220. Similarly, low emphasis/appeal images 1214 will have a relatively high compression 1224. The remaining images 1211–1213 are similarly treated as shown as items 1221–1223.

Figure 13:
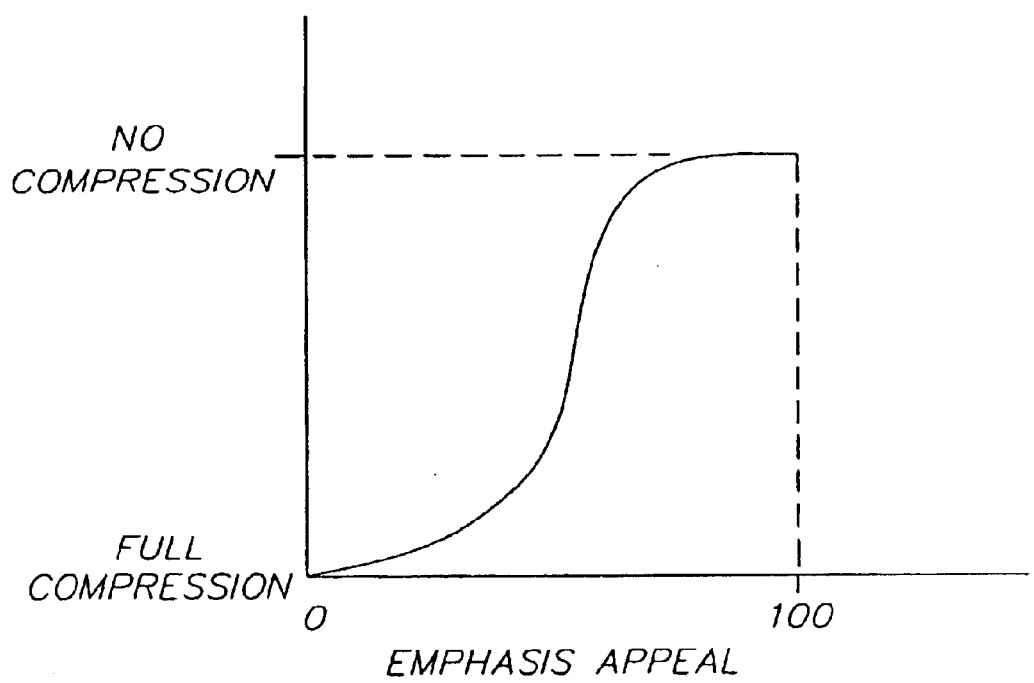
FIG. 13 is a graph showing a preferred compression scheme according to the invention.

FIG. 13 illustrates a preferred method of converting the amount of image emphasis/appeal to a compression parameter. The amount of emphasis/appeal has been represented on the x-axis while the compression parameter, which controls the amount of compression achieved when using a specific algorithm, is represented on the y-axis. In general, low emphasis/appeal images are compressed with a higher compression ration, while the high emphasis/appeal images are compressed with a lower compression ration or may even remain completely uncompressed. The invention is extremely flexible, in the sense that the compression curve shown in FIG. 13 can be designed to address a wide range of system requirements and choice of compression algorithms. In what follows, we present a few example scenarios to illustrate this point further.

Figure 14:
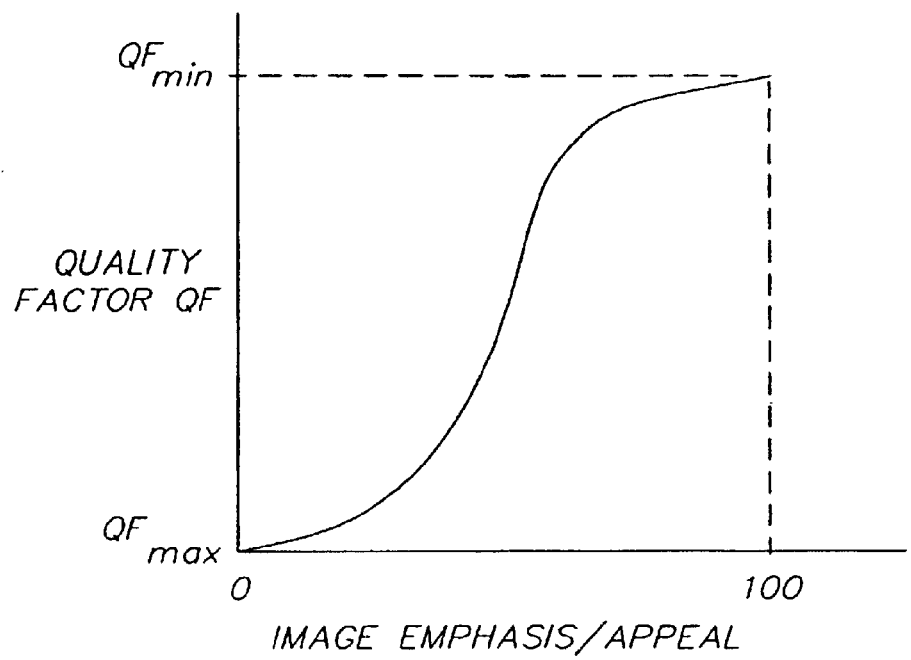
FIG. 14 is a graph showing quality factor according to the invention.

In one embodiment of the present invention, the compression method chosen is the JPEG compression standard and the compression parameter shown on the y-axis is a "quality factor" (QF) as described below. The range of QF values is typically chosen to between 0 and 100, where a QF+100 implies no compression and a QF=0 results in the maximum compression that is achievable with JPEG. As shown in FIG. 14, the emphasis/appeal score can be mapped into a quality factor that is in the range ($QF_{min}$, $QF_{max}$), where the $QF_{min}$ and $QF_{max}$ values are determined based on the requirements of the application. The specification of the QF value is now explained in more detail.

Briefly, when using JPEG compression, the digital image is formatted into 8×8 blocks of pixel values, and a linear decorrelating transformation known as the discrete cosine transform (DCT) is applied to each block to generate 8×8 blocks of DCT coefficients. The DCT coefficients are then normalized and quantized using a frequency-dependent uniform scalar quantizer.

In the JPEG standard, the user can specify a different quantizer step size for each coefficient. This allows the user to control the resulting distortion due to quantization in each coefficient. The quantizer step sizes may be designed based on the relative perceptual importance of the various DCT coefficients or according to other criteria depending on the application. The 64 quantizer step sizes corresponding to the 64 DCT coefficients in each 8×8 block are specified by the elements of an 8×8 user-defined array, called the quantization table or "Q-table". The Q-table is the main component in the JPEG system for controlling the compressed file size and the resulting decompressed image quality.

Each block of the quantized transform coefficients is ordered into a one-dimensional vector using a pre-defined zigzag scan that rearranges the quantized coefficients in the order of roughly decreasing energy. This usually results in long runs of zero quantized values that can be efficiently encoded by runlength coding. Each nonzero quantized value and the number of zero values preceding it are encoded as a amplitude/amplitude pair using a minimum redundancy-coding scheme such as Huffman coding. The binary coded transform coefficients along with an image header containing information such as the Q-table specification, the Huffman table specification, and other image-related data are either stored in a memory device or transmitted over a channel.

As mentioned previously, the ability to trade off image quality for compressed file size in JPEG is accomplished by manipulating the elements of the Q-table. In general, each of the 64 components of the Q-table can be manipulated independently of one another to achieve the desired image quality and file size (or equivalently, the desired compression ratio or bit rate) or image quality. However, in most applications, it is customary to simply scale all of the elements of a basic Q-table with a single constant. For example, multiplying all elements of a given Q-table by a scale factor larger than unity would result in a coarser quantization for each coefficient and hence a lower image quality. But at the same time, a smaller file size is achieved. On the other hand, multiplication by a scale smaller than unity would result in a finer quantization, higher image quality, and a larger file size. This scaling strategy for trading image quality for compressed file size is advocated by many developers of JPEG compression products including the Independent JPEG Group (IJG) whose free software is probably the most widely used tool for JPEG compression. A current version of the software is available at the time of this writing from ftp://ftp.uu.net/graphics/jpeg/. The IJG implementation scales a reference Q-table by using a parameter known as the "IJG quality factor" (QF), which converts a value between 1 and 100 to a multiplicative scaling factor according to the following relationship:

The value of QF spans the range of 0 (lowest quality) to 100 (highest quality). At QF=50, all elements of a reference Q-table are scaled by 1. For values of QF in the range of (1–100):

If QF<50, then QF=5000/QF

Otherwise, QF=200−2×QF

The value of QF expressed in percent is used to scale a reference Q-table, e.g., if QF=20, the Q-table elements are multiplied by 2.50. For QF=100, all the Q-table elements are set to 1. For QF=0, all the Q-table elements are set to 255 (maximum allowable by JPEG).

As mentioned before and as shown in FIG. 14, in the current invention the emphasis/appeal score can be mapped into a QF value that is in the range ($QF_{min}$, $QF_{max}$), where the reference Q-table (which is scaled by the QF value) and the $QF_{min}$ and $QF_{max}$ values are specified by the user based on the requirements of the application. It is obvious to anyone skilled in the art that there are other methods of defining a "quality factor" (QF) value than the definition used by the IJG. Such variations can be made to the disclosed embodiment without departing from the spirit of relating the compression parameter to a quality factor and are included within the scope of the claims.

Figure 15:
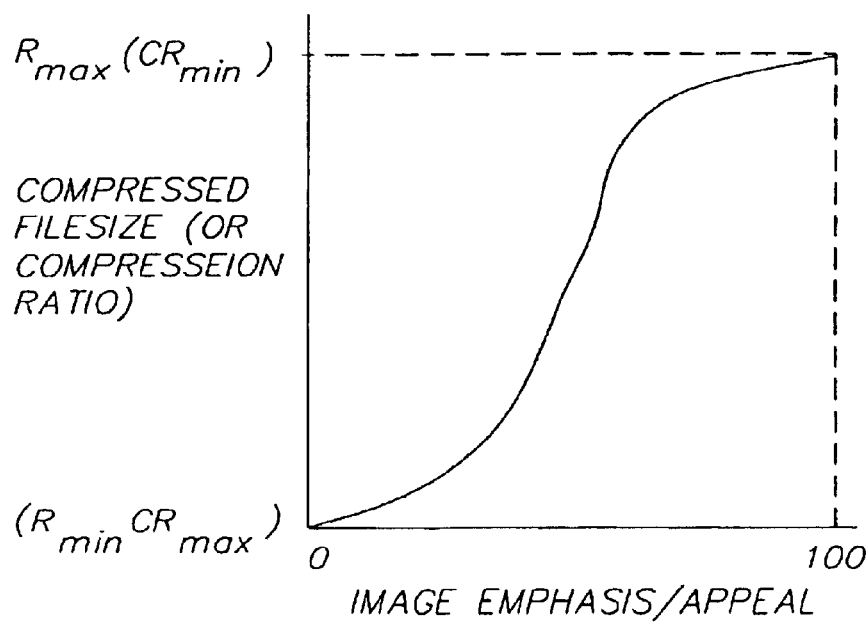
FIG. 15 is a graph showing compressed file size according to the invention.

In another embodiment of the present invention, the compression method chosen is the JPEG compression standard and the compression parameter shown on the y-axis in FIG. 13 is the compression ratio or the resulting compressed file size. This is shown in FIG. 15, where the user will define a minimum file size, $R_{min}$, (alternatively, a maximum compression ratio, $CR_{max}$) that can be tolerated by the specific application. The user also defines a maximum file size, $R_{max}$, (alternatively, a minimum compression ratio, $CR_{min}$) that will result in the highest image quality ever needed in that specific application. The user then specifies a curve that relates the appeal/emphasis score to the compressed file size (or compression ratio) based on the requirements of the application, an example of which is depicted in FIG. 15. For a given appeal/emphasis score, the resulting compression ratio is used as a target for compressing the image. It should be noted that since JPEG compression is not a fixed rate compression scheme, several compression iterations might be needed before the target file size (or compression ratio) is achieved.

In another embodiment of the present invention, the compression method chosen is the JPEG2000 compression standard and the compression parameter shown on the y-axis in FIG. 13 is the compression ratio or the resulting compressed file size as explained in the previous embodiment. Since the JPEG2000 standard can easily compress an image to a target file size, no iterations will be needed in this embodiment to achieve the desired compression ratio or file size.

It is obvious to anyone skilled in the art that there are other methods of compressing images than JPEG or JPEG2000 and that there are other means of defining compression parameters in a such a way that they relate to the quality of the reconstructed image after compression and decompression. An important feature of the current invention is that the emphasis/appeal score can be used in any desired fashion as a means of controlling the amount of compression applied to an image or as a means of controlling the reconstructed (compressed/decompressed) image quality by influencing the choice of the compression parameters that are used for compressing that image.

The large amount of storage space required by images presents unique problems to the image processing community. Therefore, image compression is commonly used to expand the storage capabilities of current storage technology. However, such image compression looses substantial amounts of detail and produces a lower quality image after decompression. The invention overcomes this storage space problem by retaining more detail of images which are more important (higher emphasis/appeal). Further, the invention allows increased compression and, therefore, decrease consumption of storage space, of images which are not likely to be very useful (lower emphasis/appeal). Indeed, the increased compression of the lower emphasis/appeal images more than makes up for the additional storage space required for the uncompressed (or lower compression level utilized with) higher emphasis/appeal images.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described with reference to a preferred embodiment. However, it will be appreciated that variations and modifications can be effected by a person of ordinary skill in the art without departing from the scope of the invention. While the invention has been described from time to time in connection with automatic image compression, it should be clear that there are many other uses for the invention, in particular any kind of image processing applications where an image needs to be evaluated for some process based on its relative or intrinsic value.

PARTS LIST

| | |
|---|---|
| 10 | image emphasis network |
| 12 | feature extraction stage |
| 14 | classification stage |
| 16 | comparator stage |
| 18 | normalization stage |
| 20 | skin area detector |
| 22 | close-up detector |
| 24 | people detector |
| 26 | skin detector |
| 28 | face detector |
| 30 | composition detector |
| 30.1 | main subject variance algorithm |
| 30.2 | main subject centrality algorithm |
| 30.3 | main subject compactness algorithm |
| 31 | clustering stage |
| 32 | subject size detector |
| 34 | main subject detector |
| 36 | sharpness detector |
| 38 | colorfulness detector |
| 40 | unique format detector |
| 42 | representative color detector |
| 44 | root node |
| 46 | leaf node |
| 50 | main subject detector |
| 52 | clustering stage |
| 110 | computer system |
| 112 | microprocessor-based unit |
| 114 | display |
| 116 | keyboard |
| 118 | mouse |
| 120 | selector |
| 122 | CD-ROM |
| 124 | CD |
| 126 | floppy disk |
| 127 | network connection |
| 128 | printer |
| 130 | PC card |
| 1200 | uncompressed images |
| 1202 | image emphasis and appeal processor |
| 1204 | compressor |
| 1210–1214 | ranked images |
| 1220–1224 | compressed images |

What is claimed is:

1. A method automatically compressing images comprising:
  (a) ranking images based upon image emphasis, wherein said ranking includes:
    (1) computing one or more quantities related to one or more features in each image, said features including a content of said images;
    (2) processing said quantities with a reasoning algorithm that is trained based on opinions of one or more human observers; and
    (3) applying said quantities to said images to produce said ranking; and
  (b) variably compressing said images depending upon said ranking.

2. The method as claimed in claim 1, wherein said features include at least one of people-related features and subject-related features.

3. The method as claimed in claim 1, wherein said computing further includes computing one or more quantities related to one or more objective features pertaining to objective measures of the digital image.

4. The method as claimed in claim 3, wherein said objective features include at least one of colorfulness and sharpness.

5. The method as claimed in claim 3, wherein said objective features include a representative quality in terms of color content.

6. The method as claimed in claim 3, wherein said objective features include a uniqueness of picture aspect format.

7. The method as claimed in claim 1, wherein said reasoning algorithm is trained from ground truth studies of candidate images.

8. The method as claimed in claim 1, wherein the reasoning algorithm comprises a Bayesian network.

9. The method as claimed in claim 1, wherein said compressing of said images is varied such that first images having a first ranking are compressed more than second images having a second ranking higher than said first ranking.

10. A method automatically compressing images comprising:
  (a) ranking images based upon image emphasis, wherein said ranking includes:
    (1) computing one or more quantities related to one or more features in each image, said features including a content of said images;
    (2) processing said quantities with a reasoning algorithm that is trained based on opinions of one or more human observers; and
    (3) applying said quantities to said images to produce said ranking; and
  (b) variably compressing said images depending upon said ranking such that first images having a first ranking are compressed more than second images having a second ranking higher than said first ranking.

11. The method as claimed in claim 10, wherein said features include at least one of people-related features and subject-related features.

12. The method as claimed in claim 10, wherein said computing further includes computing one or more quantities related to one or more objective features pertaining to objective measures of the digital image.

13. The method as claimed in claim 12, wherein said objective features include at least one of colorfulness and sharpness.

14. The method as claimed in claim 12, wherein said objective features include a representative quality in terms of color content.

15. The method as claimed in claim 12, wherein said objective features include a uniqueness of picture aspect format.

16. The method as claimed in claim 10, wherein said reasoning algorithm is trained from ground truth studies of candidate images.

17. The method as claimed in claim 10, wherein the reasoning algorithm comprises a Bayesian network.

18. The method as claimed in claim 10, wherein said content of said images is controlled using a quality factor whose value is related to image emphasis/appeal.

19. The method as claimed in claim 10, wherein content of said images is controlled based on output file size whose value is related to image emphasis/appeal.

20. The method as claimed in claim 10, wherein said content of said images is controlled using a visual quality of an output image.

21. A method automatically compressing images comprising:

(a) ranking images based upon image emphasis, wherein said ranking includes:
  (1) computing one or more quantities related to one or more objective features in each image, said objective features including a content of said images;
  (2) processing said quantities with a reasoning algorithm that is trained based on opinions of one or more human observers; and
  (3) applying said quantities to said images to produce said ranking; and
(b) variably compressing said images depending upon said ranking.

22. The method as claimed in claim 21, wherein said objective features include at least one of people-related objective features and subject-related objective features.

23. The method as claimed in claim 21, wherein said objective objective features include at least one of colorfulness and sharpness.

24. The method as claimed in claim 21, wherein said objective objective features include a representative quality in terms of color content.

25. The method as claimed in claim 21, wherein said objective objective features include a uniqueness of picture aspect format.

26. The method as claimed in claim 21, wherein said reasoning algorithm is trained from ground truth studies of candidate images.

27. The method as claimed in claim 21, wherein the reasoning algorithm comprises a Bayesian network.

28. The method as claimed in claim 21, wherein said compressing of said images is varied such that first images having a first ranking are compressed more than second images having a second ranking higher than said first ranking.

* * * * *